(12) United States Patent
Shieh

(10) Patent No.: US 6,715,785 B2
(45) Date of Patent: Apr. 6, 2004

(54) LOCKING DEVICE FOR A FOLDABLE GOLF CART

(76) Inventor: Shanq-Ching Shieh, 6 Fl., No. 105, Yung-An St., Yuanlin Chen, Changhua Hsien (TW)

( * ) Notice: Subject to any disclaimer, the term of this patent is extended or adjusted under 35 U.S.C. 154(b) by 0 days.

(21) Appl. No.: 10/157,110

(22) Filed: May 30, 2002

(65) Prior Publication Data

US 2003/0222429 A1 Dec. 4, 2003

(51) Int. Cl.[7] ............................................... B62B 3/02
(52) U.S. Cl. ............... 280/651; 280/47.34; 280/DIG. 6
(58) Field of Search ............................ 280/639, 651, 280/654, 642, 655.1, 47.41, 47.34, 62, DIG. 6, 47.18; 16/231, 409, 410; 180/19.1, 19.2; 292/128

(56) References Cited

U.S. PATENT DOCUMENTS

| | | | | |
|---|---|---|---|---|
| 4,793,622 A | * | 12/1988 | Sydlow | 280/40 |
| 4,869,526 A | * | 9/1989 | Blake | 280/645 |
| 5,201,540 A | * | 4/1993 | Wu | 280/646 |
| 5,281,044 A | * | 1/1994 | Chen | 403/328 |
| 5,582,419 A | * | 12/1996 | Lucia et al. | 280/42 |
| 5,749,424 A | * | 5/1998 | Reimers | 180/19.2 |
| 5,857,684 A | * | 1/1999 | Liao et al. | 280/40 |
| 6,000,712 A | * | 12/1999 | Wu | 280/639 |
| 6,152,465 A | * | 11/2000 | Shieh | 280/62 |
| 6,168,174 B1 | * | 1/2001 | MacDougall | 280/47.34 |
| 6,273,452 B1 | * | 8/2001 | Wu | 280/652 |
| 6,435,539 B1 | * | 8/2002 | Wu | 280/652 |

* cited by examiner

*Primary Examiner*—Brian L. Johnson
*Assistant Examiner*—Jeff J. Restifo
(74) *Attorney, Agent, or Firm*—Bacon & Thomas, PLLC

(57) ABSTRACT

A locking device for a golf cart has a bracket, two sleeves, two engaging bars and a securing member. The bracket is pivotally connected to an axle to which the rear wheels are mounted. The sleeves are securely connected to the bracket and are rotatably mounted around the axle, such that the bracket is pivotally connected to the axle with the sleeves. An engaging bar selectively laterally extends outward from one of the stem and the bracket. The securing member is pivotally attached to the chassis with a pivot. The securing member has engaging hole for positioning the engaging plate in place and a pressed segment for the user to press by foot the securing member. Accordingly, the user can operate the locking device by foot, and to fold or to expand the golf cart is convenient.

14 Claims, 8 Drawing Sheets

LOCKING DEVICE FOR A FOLDABLE GOLF CART

BACKGROUND OF THE INVENTION

1. Field of the Invention

The present invention relates to a locking device, and more particularly to a locking device for a foldable golf cart and that can be operated with the foot of the user.

2. Description of Related Art

A golf cart is used to carry the objects for playing golf such as clubs, golf balls and so on, such that the golf player can play golf with ease and comfort. A conventional golf cart comprises a chassis, a front wheel, at least one rear wheel, an actuating device and a handle. The chassis is used to support the golf objects. The front wheel is rotatably attached to one end of the chassis, and the rear wheels are rotatably attached to the other end of the chassis. The actuating device is mounted on the chassis to actuate the rear wheels to rotate. The handle is connected to the chassis for the user to steer the movement of the golf cart. To reduce the space for storing or transporting the golf cart, a locking device is mounted between the chassis and the handle. Accordingly, the handle can be folded relative to the chassis, such that to store and to transport the golf cart is convenient.

However, the conventional locking device must be manually operated by the user. To operate the locking device, the user must squat down to manually release the securing device of the locking device. Consequently, the operation of the conventional locking device is inconvenient.

To overcome the shortcoming, the present invention tends to provide a golf cart to mitigate or obviate the aforementioned problems.

SUMMARY OF THE INVENTION

The main objective of the invention is to provide a locking device for a golf cart and that can be operated with the foot of the user. The locking device has a bracket, two sleeves, two engaging bars and a securing member. The bracket is connected to an axle to which the rear wheels are mounted. The sleeves are securely connected to the bracket and are mounted around the axle, such that the stem of the golf cart is operationally connected to the axle with the bracket and the sleeves. An engaging bar selectively laterally extends outward from one of the stem and the bracket. The securing member is pivotally attached to the chassis with a pivot. The securing member has engaging hole for positioning the stem in place and a pressed segment for the user to press by foot the securing member. With such a locking device, the user can conveniently operate the locking device by foot, to fold or to expand the golf cart.

Other objects, advantages and novel features of the invention will become more apparent from the following detailed description when taken in conjunction with the accompanying drawings.

DETAILED DESCRIPTION OF PREFERRED EMBODIMENT

Figure 1:
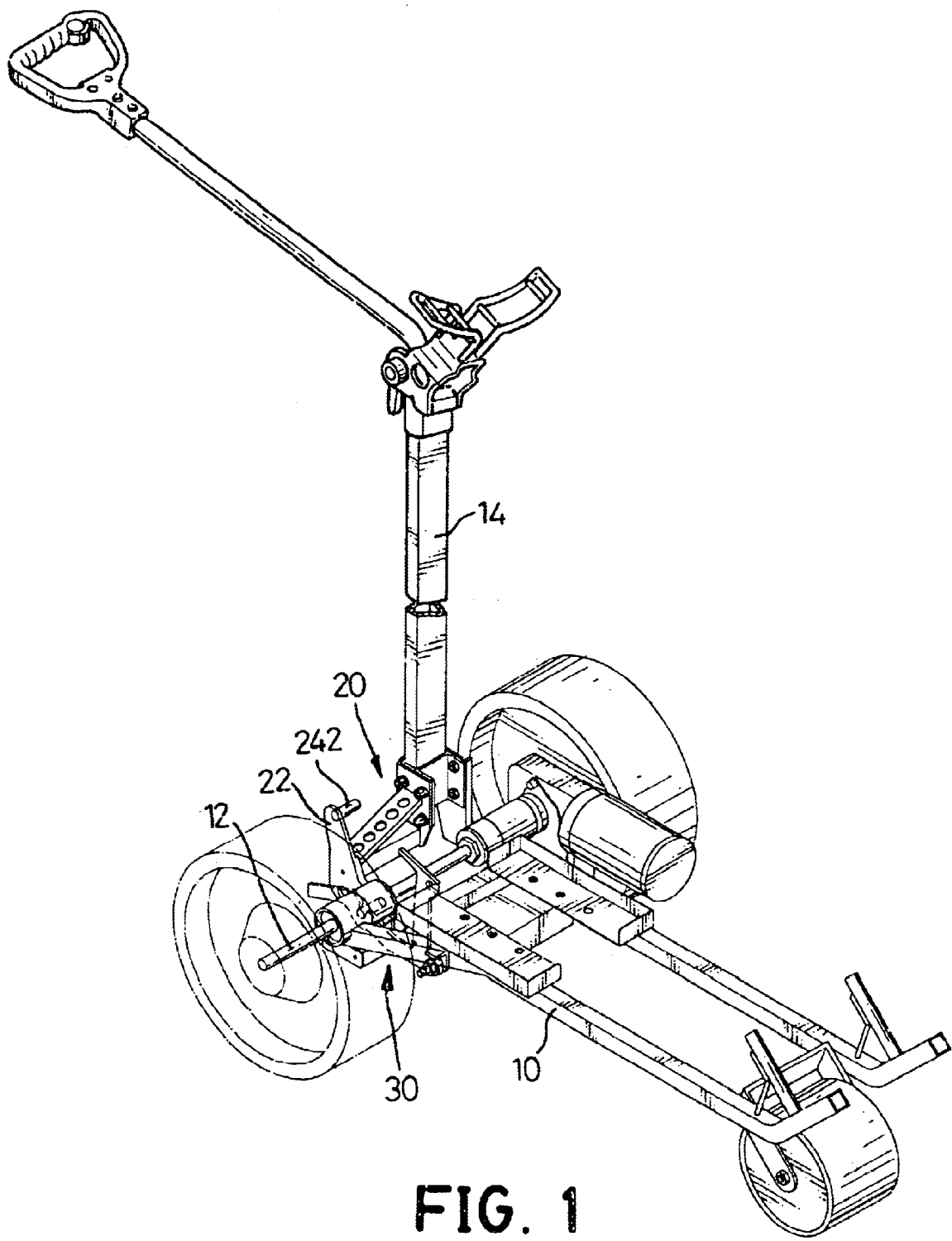
FIG. 1 is a perspective view of a golf cart with a locking device in accordance with the present invention.
Figure 2:
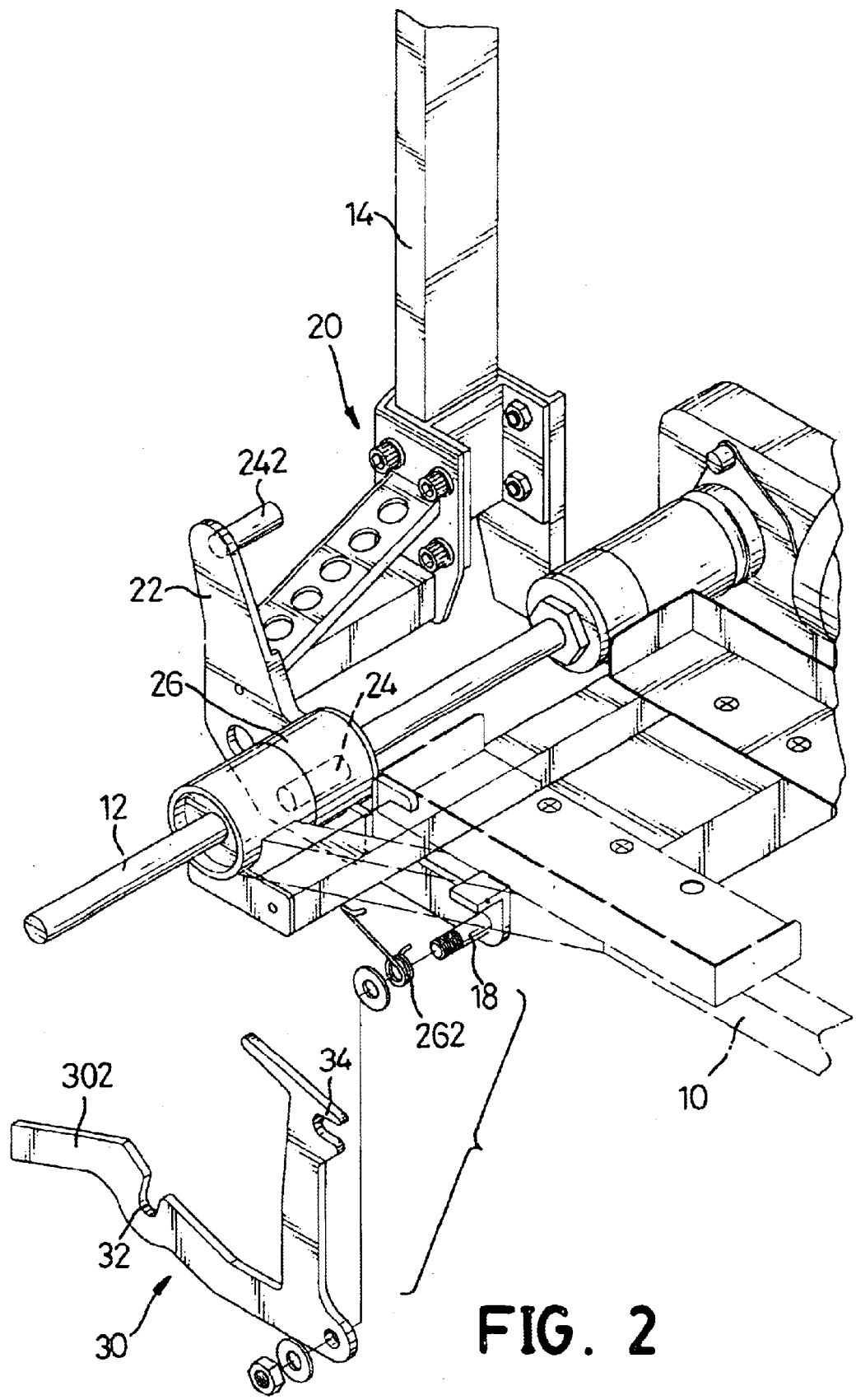
FIG. 2 is an exploded perspective view of the locking device in FIG. 1.

With reference to FIGS. 1 and 2, a locking device for a golf cart in accordance with the present invention comprises a bracket (20), two sleeves (26), two engaging bars (24, 242) and a securing member (30). The bracket (20) is pivotally connected to an axle (12) on which the rear wheels (not numbered) of the golf cart are mounted, and the stem (14) of the golf cart is secured on the bracket (20). The sleeves (26) are respectively securely attached to two sides of the bracket (20) and are rotatably mounted around the axle (12), such that the bracket (20) is pivotally connected to the axle (12) with the sleeves (26). An engaging plate (22) is securely attached to one of the sleeves (26). The two engaging bars (24, 242) laterally extend outward from the engaging plate (22) in a same direction. Wherein, the first engaging bar (24) is mounted on the engaging plate (22) near the sleeve (26) near which the engaging plate (22) is mounted, and the second engaging bar (242) is mounted near the top of the engaging plate (22).

The securing member (30) is pivotally attached to the chassis (10) of the golf cart with a pivot (18). Two engaging holes (32, 34) are defined in the securing member (30) respectively correspond to the engaging bars (24, 242) on the engaging plate (22). Wherein, one of the engaging holes (32, 34) engages with one of the engaging bars (24, 242) on the engaging plate (22) when the stem (14) is in an expansion position or a folded position relative to the chassis (10). A pressed segment (302) is formed on a free end of the securing member (30), and the pressed segment (302) extends outward from the chassis (10). A torsion spring (262) is mounted around the pivot (18). Two ends of the torsion spring (262) respectively abut the securing member (30) and the chassis (10) so as to provide a recoil force to the securing member (30).

Figure 3:
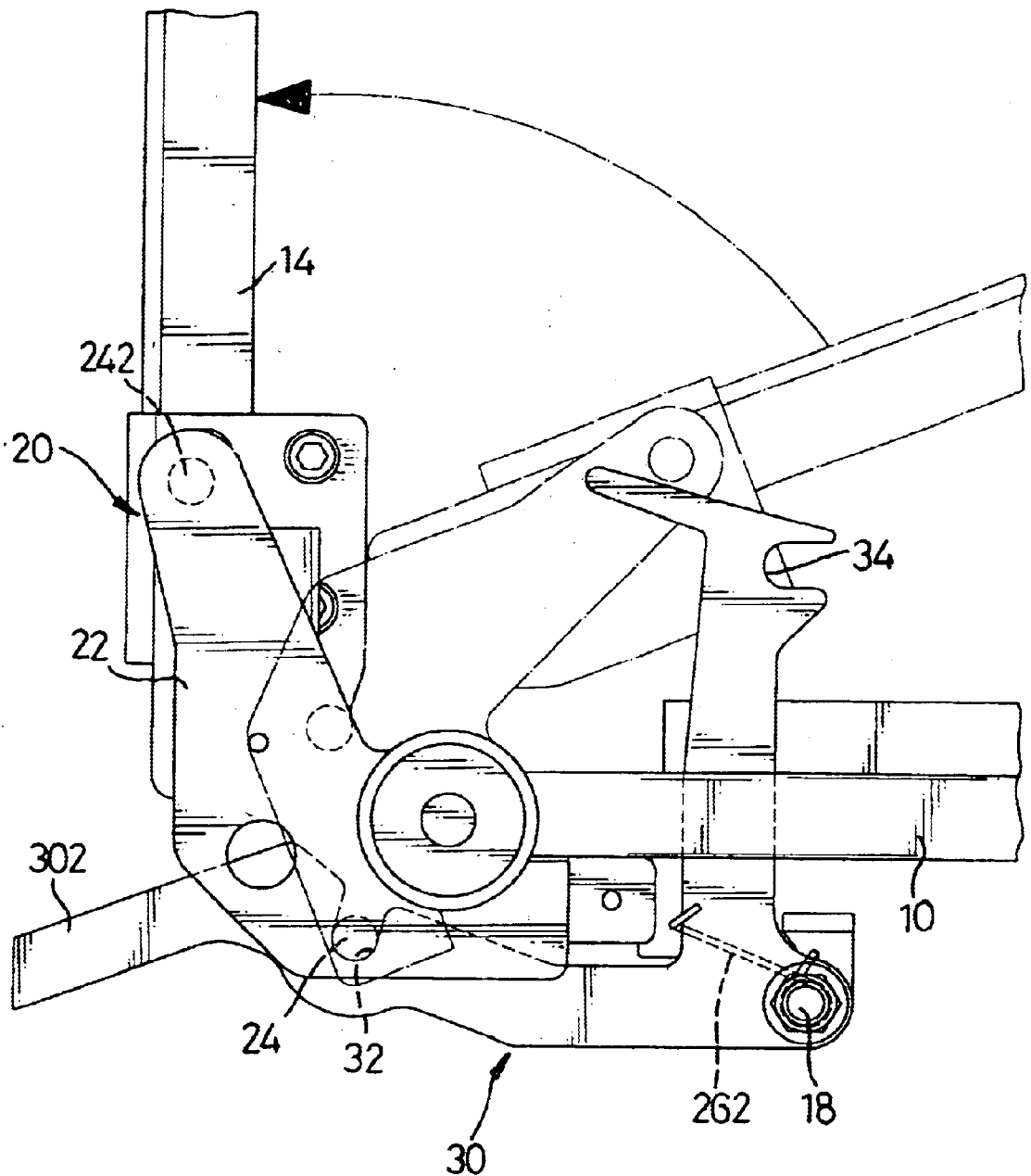
FIG. 3 is a side plan view of the locking device in FIG. 1 showing that the locking device is in an expansion position.

With reference to FIGS. 2 and 3, when the stem (14) of the golf cart with the bracket (20) is rotated to a vertical position relative to the chassis (10), the first engaging bar (24) on the engaging plate (22) will engage with the first engaging hole (32) in the securing member (30). Consequently, the stem (14) of the golf cart can be held in an expansion position due to the engagement between the first engaging bar (24) on the engaging plate (22) and the first engaging hole (32) in the securing member (30). The user can steer the golf cart with the expanded stem (14).

Figure 4:
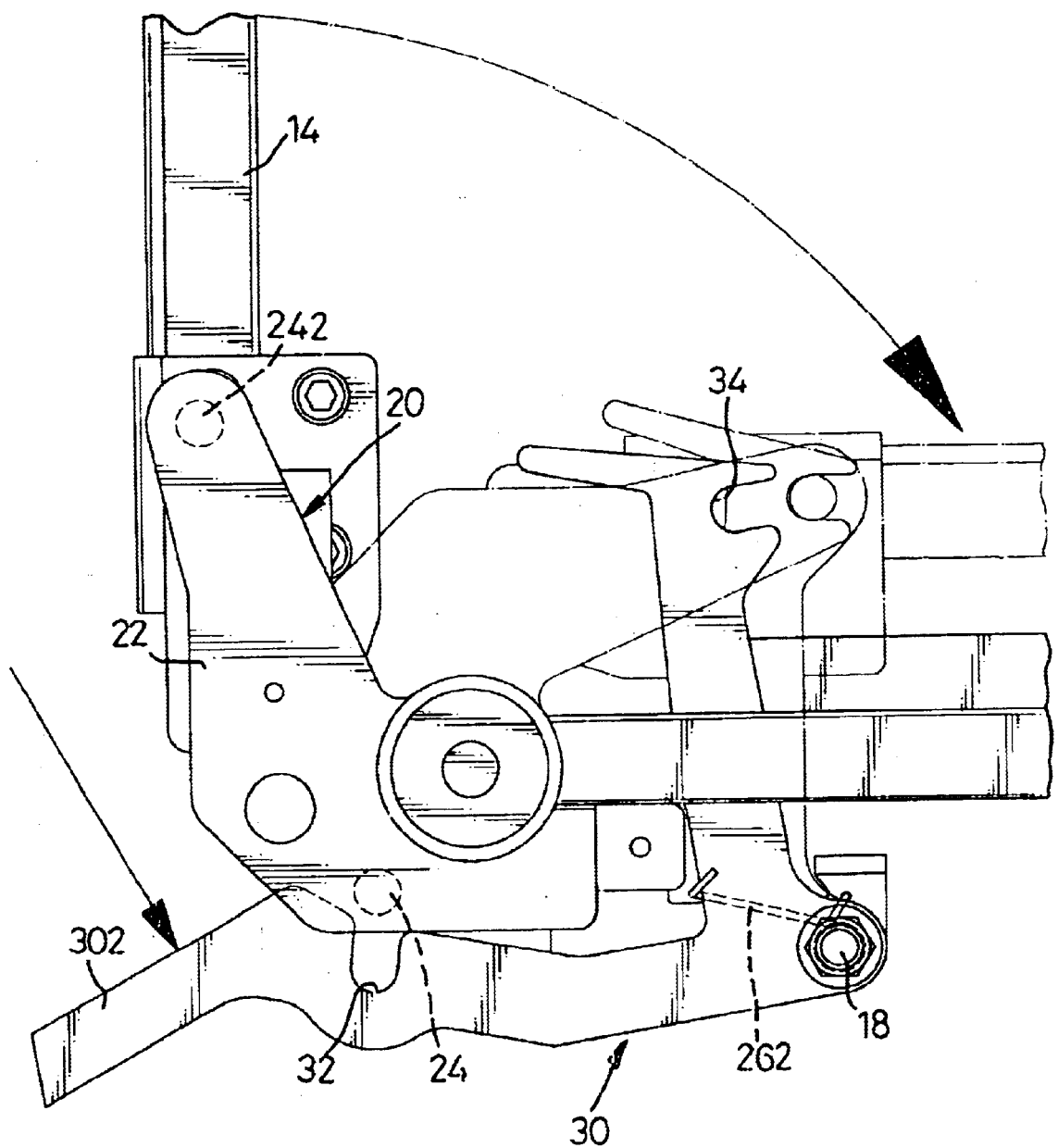
FIG. 4 is an operational side plan view of the locking device in FIG. 1 showing that the securing member is pressed to release from the first engaging bar on the engaging plate.
Figure 5:
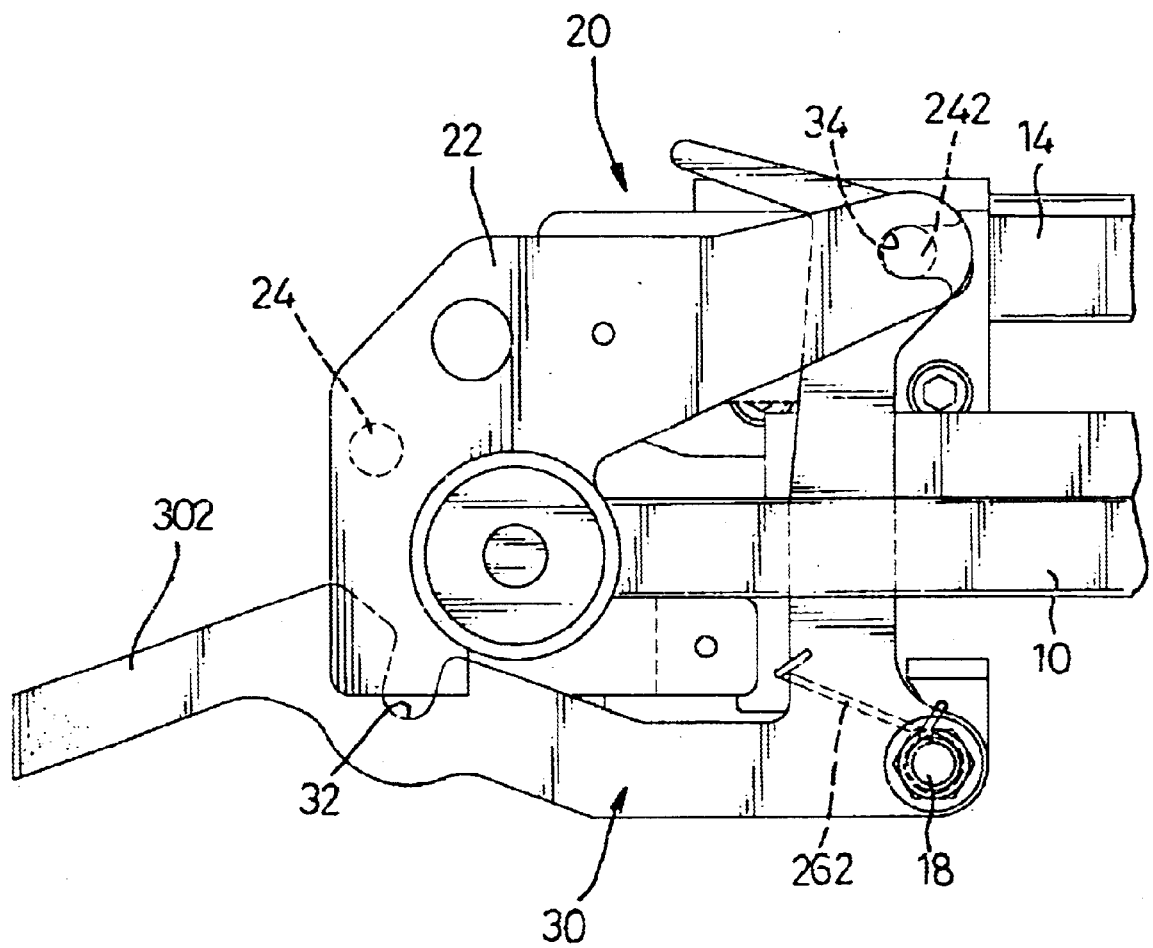
FIG. 5 is a side plan view of the locking device in FIG. 1 showing that the locking device is in a folded position.

With reference to FIGS. 2, 4 and 5, because the pressed segment (302) of the securing member (30) extends outward from the chassis (10), the user can easily press the pressed segment (302) of the securing member (30) with his or her foot. When the user presses by foot the pressed segment (302) of the securing member (30), the securing member (30) will rotate relative to the chassis (10) and the first engaging hole (32) will release from the first engaging bar (24) on the engaging plate (20). Thus, the locked condition of the bracket (20) will be released, and the bracket (20) with the engaging plate and the stem (14) can rotate relative to the chassis (10) with the axle (12). When the bracket (20) rotates to a position where the second engaging bar (242) faces the second engaging hole (34) in the securing member (30), the second engaging hole (34) will engage with the second engaging bar (242) with the recoil force provided by the torsion spring (18) after the user releases the pressed segment (302) of the securing member (30). Consequently, the bracket (20) and the stem (14) will be held in a folded position, and the space required for storing or transporting the golf cart can be reduced. To expand the stem (14), the user can also press by foot the pressed segment (302) of the securing member (30) to release the locked condition of the bracket (20) and the stem (14). Therefore, the user can operate the locking device by foot and to squat down is not necessary, thus the operation of the locking device is convenient.

Figure 6:
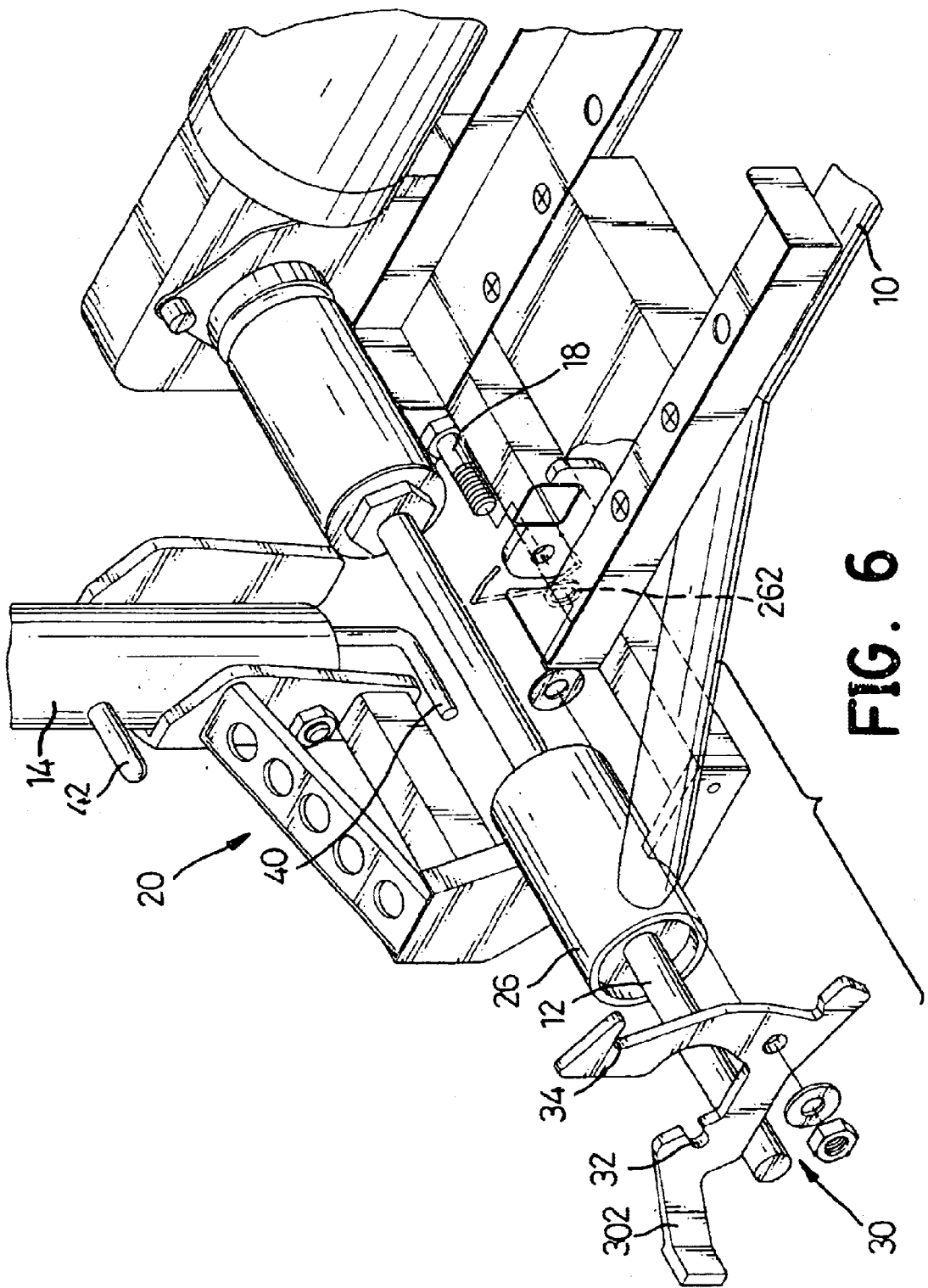
FIG. 6 is an exploded perspective view of another embodiment of a locking device in accordance with the present invention.
Figure 7:
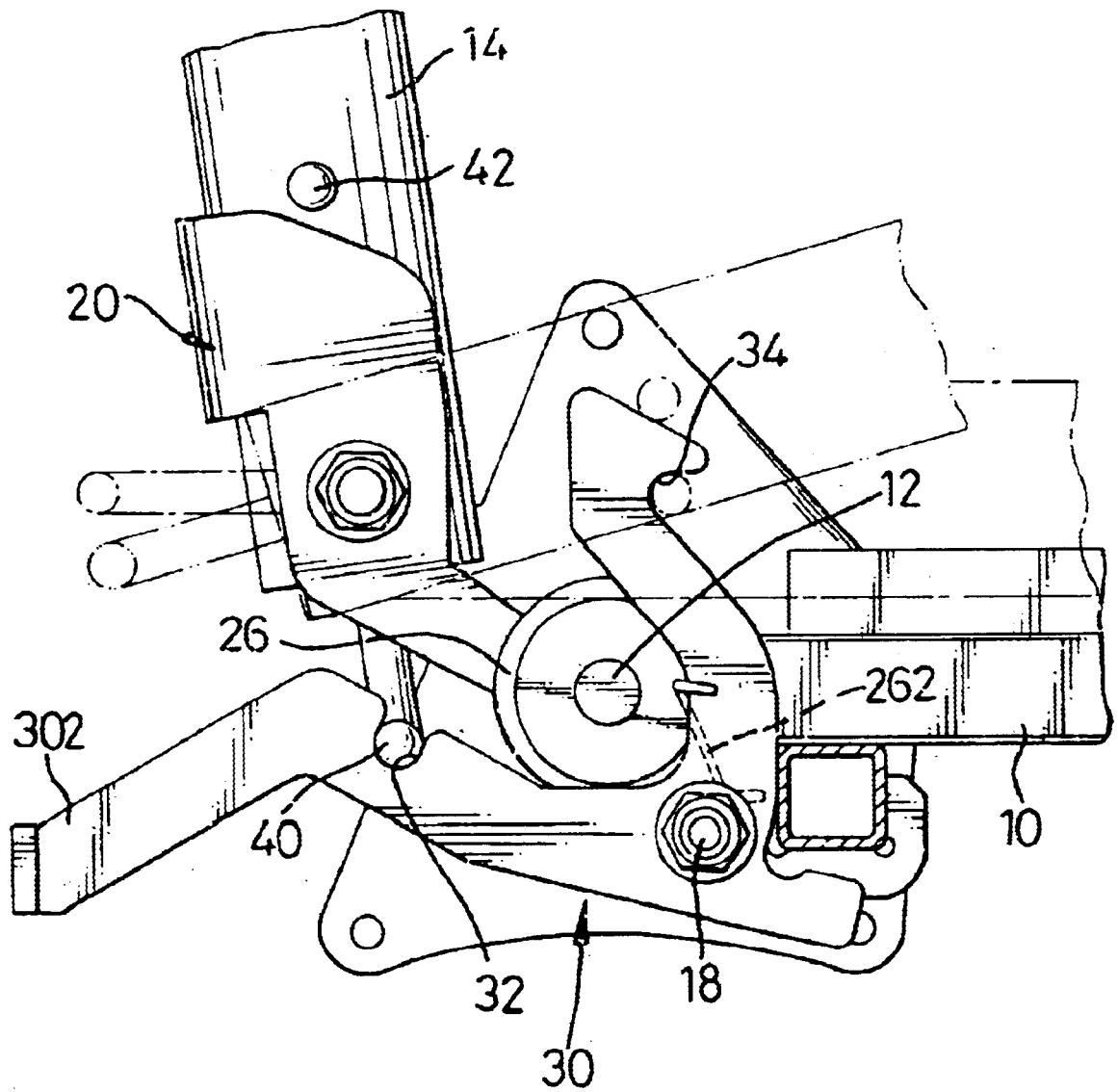
FIG. 7 is an operational side plan view of the locking device in FIG. 6 showing the operation of the locking device.

With reference to FIGS. 6 and 7, the bracket (20) is securely connected to the axle (12), and the stem (14) is pivotally attached to the bracket (20). Two engaging bars (40, 42) laterally extend outward from the stem (14) in a same direction and respectively correspond to the engaging holes (32, 34) in the securing member (30).

When the stem (14) is rotated to the bracket (20) to a vertical position relative to the chassis (10), the first engaging bar (40) on stem (14) will engage with the first engaging hole (32) in the securing member (30). The stem (14) can be held in an expansion position due to the engagement between the first engaging bar (40) and the first engaging hole (32) in the securing member (30). When the user presses by foot the pressed segment (302) of the securing member (30), the securing member (30) will rotate relative to the chassis (10) and the first engaging hole (32) will release from the first engaging bar (40) on the stem (14). The locked condition of the stem (14) will be released, and the stem (14) can rotate relative to the bracket (20). When the stem (14) rotates to a position where the second engaging bar (42) faces the second engaging hole (34) in the securing member (30), the second engaging hole (34) will engage with the second engaging bar (42) with the recoil force provided by the torsion spring (18) after the user releases the pressed segment (302) of the securing member (30). Consequently, the stem (14) will be held in a folded position, and the space required for storing or transporting the golf cart can be reduced. To expand the stem (14), the user can also press by foot the pressed segment (302) of the securing member (30) to release the locked condition of the stem (14). Accordingly, the user can operate the locking device by foot and to squat down is not necessary, thus the operation of the locking device is convenient.

Figure 8:
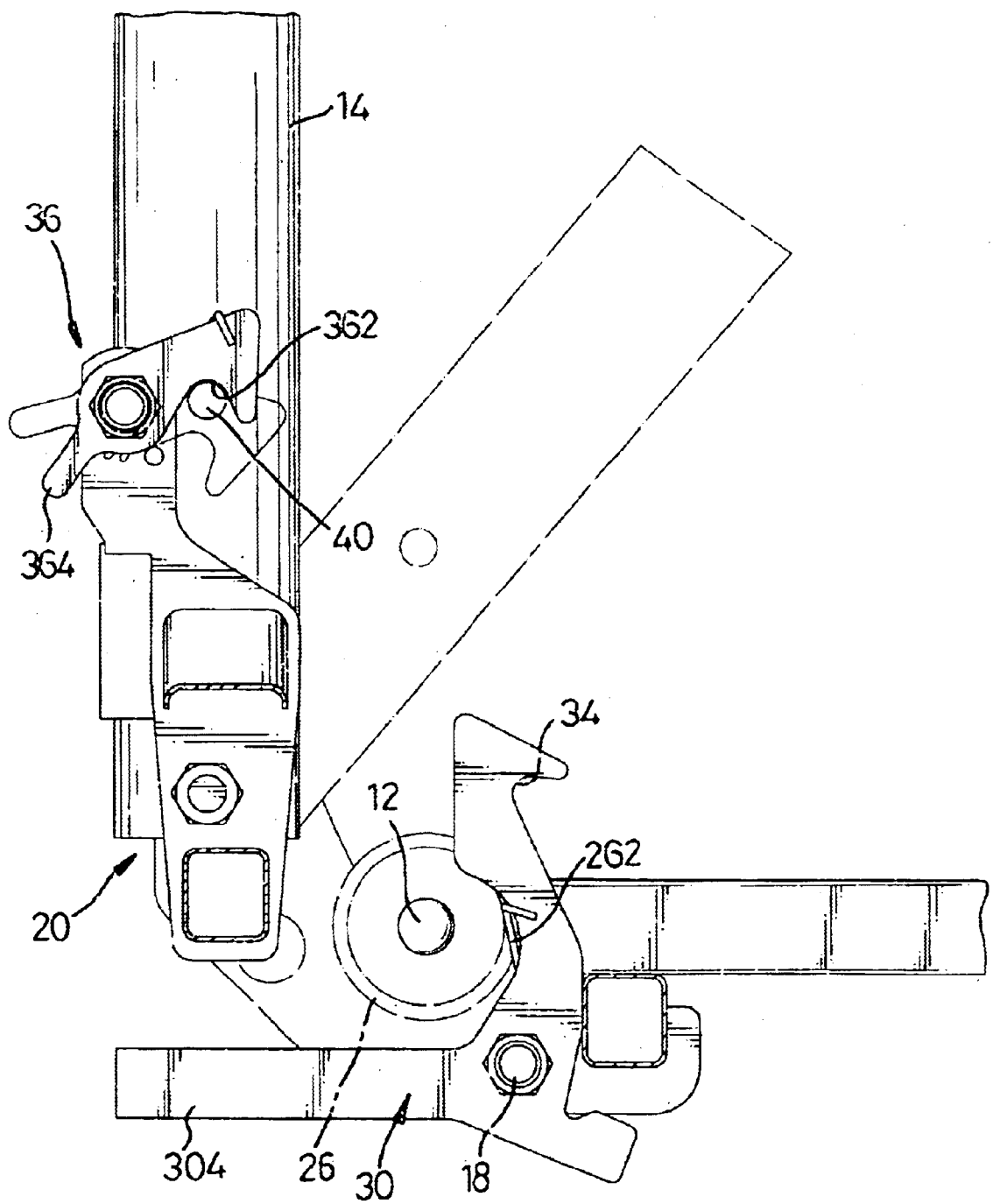
FIG. 8 is an operational side plan view of a third embodiment of a locking device in accordance with the present invention.

With reference to FIG. 8, the bracket (20) is securely connected to the axle (12), and the stem (14) is pivotally attached to the bracket (20). The sleeves (26) are securely attached respectively to two sides of the bracket (20) and are securely mounted around the axle (12), such that the bracket (20) is securely connected to the axle (12) with the sleeves (26). The engaging bar (40) is securely attached to the stem (14) and is near the bracket (20). The securing member (30) is pivotally attached to the chassis (10) with a pivot (18). An engaging hole (34) is defined in the top of the securing member (30) and corresponds to the engaging bar (40). A pressed segment (304) is formed on the other end of the securing member (30) far from the engaging hole (34) and extends outward from the chassis (10). A torsion spring (262) is mounted around the pivot (18) and has two ends respectively abutting the securing member (30) and the chassis (10) so as to provide a recoil force to the securing member (30).

A second securing member (36) is pivotally attached to the bracket (20) with a pivot (not numbered). An engaging hole (362) is defined in the top of the second securing member (36) and corresponds to the engaging bar (40). A pressed segment (364) is formed on the other end of the second securing member (36) far from the engaging hole (362) and extends outward from the chassis (10). A torsion spring (not numbered) is mounted around the pivot and has two ends respectively abutting the second securing member (36) and the bracket (20) so as to provide a recoil force to the second securing member (36).

Consequently, the engaging holes (302, 362) in the securing member (30) and the second securing member (36) can respectively engage with the engaging bar (40) in the stem (14) when the stem (14) is in a folded position or an expansion position relative to the chassis (10).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locking device for a foldable golf cart having a chassis, a front wheel rotatably attached on one end of the chassis, at least one rear wheel rotatably attached to the other end of the chassis with an axle, a stem foldably connected to the chassis with the locking device and a handle foldably attached to a top of the stem, and the locking device comprising:

a bracket adapted to be connected to the axle and adapted for operationally attaching the stem to the axle;

two sleeves securely connected to the bracket and adapted to be mounted around the axle;

a securing member adapted to be pivotally attached to the chassis with a pivot and having an engaging hole defined in a top of the securing member and adapted for positioning the stem in place, and a pressed segment formed on a free end of the securing member far from the top of the securing member and adapted to extend outward from the chassis; and an engaging bar corresponding to the engaging hole in the securing member and adapted for rotatably connecting to the axle, wherein the engaging hole engages with the engaging bar when the stem is in a folded position relative to the chassis.

2. The locking device as claimed in claim 1, wherein the sleeves are adapted to be rotatably mounted around the axle;

the bracket is adapted for the stem securely attached to the bracket so as to rotatably connect the stem to the axle through the bracket and the sleeves;

an engaging plate is securely attached to one of the sleeves; and the engaging bar laterally extends outward form the engaging plate and is mounted near a top of the engaging plate.

3. The locking device as claimed in claim 2 further comprising a second engaging bar laterally extending outward from the engaging plate in a direction same to that of the first engaging bar and mounted on the engaging plate near the sleeve near which the engaging plate is mounted; and a second engaging hole defined in the securing member and corresponding to the second engaging bar to engage with the second engaging bar when the stem is in an expansion position relative to the chassis.

4. The locking device as claimed in claim 3 further comprising a torsion spring adapted to be mounted around the pivot and having a first end abutting the securing member and a second end adapted to abut the chassis.

5. The locking device as claimed in claim 1, wherein the sleeves are adapted to be securely mounted around the axle;

the bracket is adapted for the stem rotatably attached to the bracket so as to rotatably connect the stem to the axle through the bracket and the sleeves; and the engaging bar is adapted for laterally extending outward from the stem.

6. The locking device as claimed in claim 5 further comprising a second engaging bar adapted for laterally extending outward from the stem in a direction same to that of the engaging bar; and a second engaging hole defined in the securing member and corresponding to the second engaging bar to engage with the second engaging bar when the stem is in an expansion position relative to the chassis.

7. The locking device as claimed in claim 5 further comprising a torsion spring adapted to be mounted around the pivot and having a first end abutting the securing member and a second end adapted to abut the chassis.

8. The locking device as claimed in claim 5 further comprising a second securing member rotatably mounted on the bracket and having an engaging hole defined in on one end of the second securing member to engage with the engaging bar when the stem is in an expansion position relative to the chassis and a pressed segment formed on the other end of the second securing member and adapted to extend outward from the chassis.

9. The locking device as claimed in claim 1, wherein the sleeves are adapted to be securely mounted around the axle;

the bracket is adapted for the stem rotatably attached to the bracket so as to rotatably connect the stem to the axle through the bracket and the sleeves; and the engaging bar is adapted for laterally extending outward from the stem.

10. The locking device as claimed in claim 9 further comprising a second engaging bar adapted for laterally extending outward from the stem in a direction same to that of the engaging bar; and a second engaging hole defined in a top of the securing member far from the pressed segment and corresponding to the second engaging bar to engage with the second engaging bar when the stem is in a folded position relative to the chassis.

11. The locking device as claimed in claim 9 further comprising a torsion spring adapted to be mounted around the pivot and having a first end abutting the securing member and a second end adapted to abut the chassis.

12. A locking device for a foldable golf cart having a chassis, a front wheel rotatably attached on one end of the chassis, at least one rear wheel rotatably attached to the other end of the chassis with an axle, a stem foldably connected to the chassis with the locking device and a handle foldably attached to a top of the stem, and the locking device comprising:

a bracket adapted to be connected to the axle and adapted for operationally attaching the stem to the axle;

two sleeves securely connected to the bracket and adapted to be mounted around the axle;

a securing member adapted to be pivotally attached to the chassis with a pivot and having a pressed segment formed on a free end of the securing member and adapted to extend outward from the chassis, and an engaging hole defined in the securing member near the pressed segment and adapted for positioning the stem in place; and an engaging bar corresponding to the engaging hole in the securing member and adapted for rotatably connecting to the axle, wherein the engaging hole engages with the engaging bar when the stem is in an expansion position relative to the chassis.

13. The locking device as claimed in claim 12, wherein the sleeves are adapted to be rotatably mounted around the axle;

the bracket is adapted for the stem securely attached to the bracket so as to rotatably connect the stem to the axle through the bracket and the sleeves;

an engaging plate is securely attached to one of the sleeves; and the engaging bar laterally extends outward form the engaging plate and is mounted on the engaging plate near the sleeve near which the engaging plate is mounted.

14. The locking device as claimed in claim 13 further comprising a torsion spring adapted to be mounted around the pivot and having a first end abutting the securing member and a second end adapted to abut the chassis.

* * * * *